(No Model.)
T. WALLACE.
UNDERGROUND CONDUIT.
No. 406,978. Patented July 16, 1889.
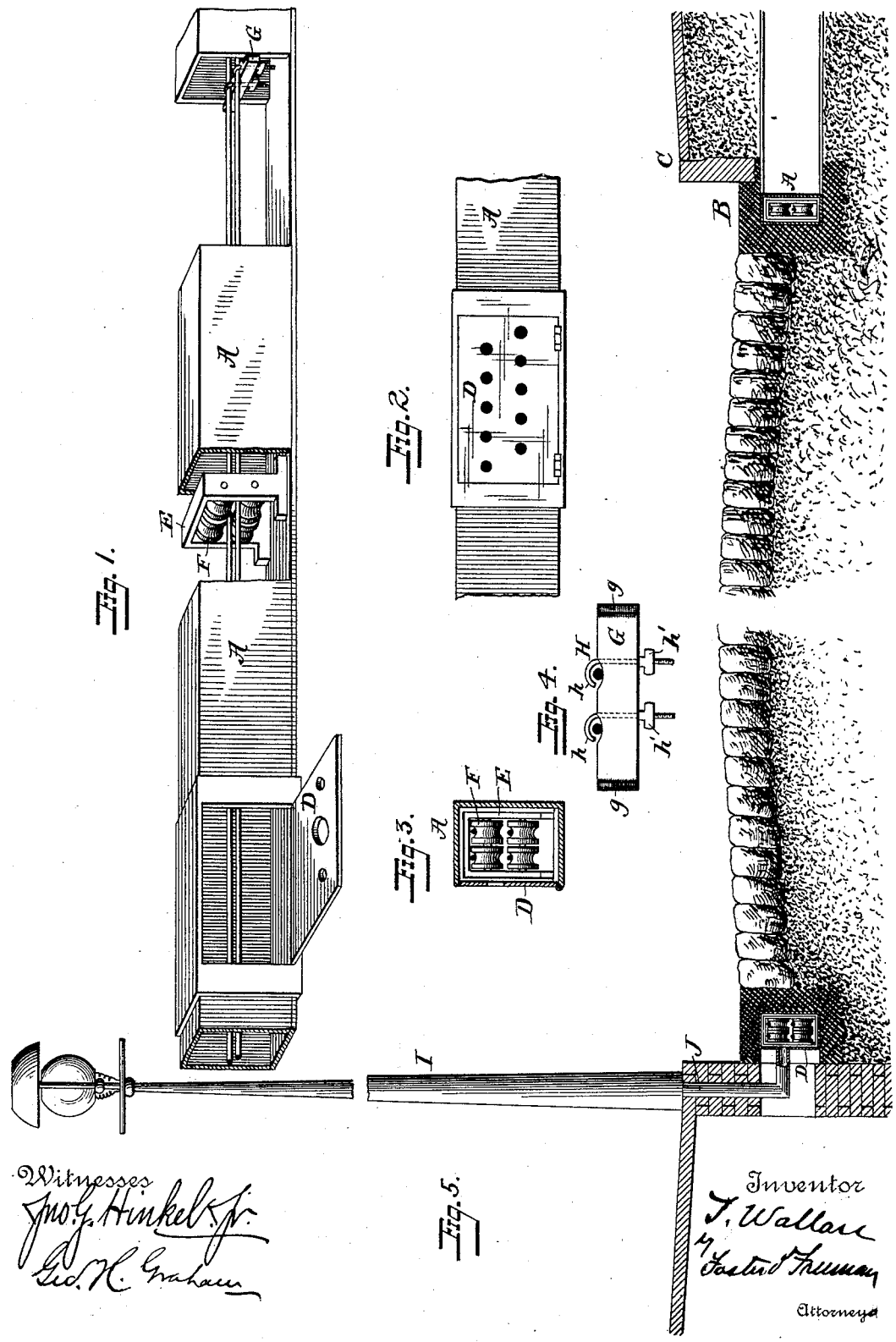

UNITED STATES PATENT OFFICE.

THOMAS WALLACE, OF NEW YORK, N. Y., ASSIGNOR TO THE NEW YORK ATMOSPHERIC CONDUIT ELECTRIC LIGHT AND POWER COMPANY, OF WEST VIRGINIA.

UNDERGROUND CONDUIT.

SPECIFICATION forming part of Letters Patent No. 406,978, dated July 16, 1889.

Application filed January 25, 1889. Serial No. 297,569. (No model.)

*To all whom it may concern:*

Be it known that I, THOMAS WALLACE, a citizen of the United States, residing at New York, in the county and State of New York, have invented certain new and useful Improvements in Underground Conduits, of which the following is a specification.

My invention relates to underground conduits or subways for electric conductors, and is an improvement on my patent, No. 371,111, issued October 4, 1887, and it has for its object to produce a simple, cheap, and effective conduit, which shall have the quality of preserving the current of electricity and the insulation of the conductors to the highest degree, and at the same time be accessible in use and practical in construction; and to these ends my invention consists in a conduit formed substantially as hereinafter set forth.

Referring to the accompanying drawings, Figure 1 is a perspective view illustrating a portion of a conduit as I prefer to construct it. Fig. 2 is a detail showing a different form of hand-hole from that shown in Fig. 1. Fig. 3 is a sectional view showing the metal frame, with insulator-spools for supporting the wires or conductors. Fig. 4 is a detail of the grip and brace for securing the conductors, and Fig. 5 is a sectional view indicating the manner of using my conduit in a street.

One of the greatest difficulties in the practical maintenance of electric conductors underground and the preservation of the electric current within the conductors, (which from the resistance it meets with in the circuit heats the conductors,) these having usually been placed in the earth in some form or other where dampness always exists, has been caused by condensation, which carries off the current from the conductors in a manner well understood by those skilled in the art, and it is one of the objects of my invention to provide means whereby condensation cannot take place and the accumulation of moisture in the conduit is prevented and the current of electricity is preserved.

Another objection to underground conduits is their great expense and the difficulty in making branch connections with the conductors in the conduit, so as to furnish a simple method of supplying to patrons telegraph and telephone communication and electric light and power, and I have overcome these difficulties by providing a simple, cheap, and at the same time an efficient conduit. The conduit itself consists of a casing A, which may be made of any suitable material—as iron, wood, cement, stone, or brick, as the exigencies of the case may necessitate—and this casing is embedded in cement, asphalt, or other material, which is preferably arranged beneath the gutters B on the sides of the street at or near the line of the curb C.

At intervals along the conduit—as, for instance, twenty or twenty-five feet apart—are arranged a series of doors D, and these are preferably arranged on the side when the conduit is laid alongside of a vault or other opening, but may be, of course, arranged upon the top or in any other convenient place, and when practicable these doors are perforated, as indicated, so as to allow the admission of air to the conduit.

Arranged at suitable places in the conduit are supports E, carrying a number of insulating spools or rollers F, which are preferably made in the form shown in Fig. 3, of glass, porcelain, or other insulating material, and being mounted upon shafts they freely revolve in drawing the conductors through and support them in proper position; also, at suitable intervals, and especially adjacent to the hand-holes, are arranged braces G, having means for clamping the conductors and holding them taut and in proper position. If, for instance, they are to be cut to make a loop or side connection, these braces are made of insulating material or covered at their ends, as indicated at *g*, with rubber or other similar insulation. I have shown a clamp H, consisting of a rod having a bent end *h*, to embrace the conductor, and provided with a screw-nut *h'*, to regulate the pressure. These braces may be secured permanently in the conduit, or may be separate and independent thereof and used when occasion requires.

The conduit is connected at intervals with hollow lamp-posts, as I, by means of a suitable tube J. The lamp-posts are used to support an electric lamp, also to furnish a passage for the conductors; but if, perchance, the electric lamp is not used on the post, the tube and post will serve their purpose as a ventilating-shaft for the conduit. By thus connecting the conduit to the hollow lamp-posts and providing openings in the doors of the hand-holes a constant current of air is caused to pass through the conduit, which will prevent condensation and remove all moisture which may be incident thereto, and maintain the conductors under a dry atmospheric insulation. This arrangement has another advantage, in that it overcomes the danger from explosions of gases which may permeate the conduit, and which of late have been of frequent occurrence, as the currents of air will assist and insure the discharge of any gas which may under any circumstances enter the conduit, the difference in pressure and temperature of the air in the conduit and at the top of the lamp-posts acting to maintain a constant circulation.

What I claim is—

1. An electric conduit consisting of a casing embedded in asphalt or other material and arranged alongside the curb, hollow lamp-posts connected at intervals with the conduit, hand-holes provided with perforated doors, and supports arranged at intervals in the conduit and having insulating spools or rollers upon which the conductors are held, whereby a free circulation may be maintained throughout the conduit in connection with the freely-supported conductors, substantially as described.

2. The combination, with a conduit, of the insulating guide-rollers to support the conductors, and the clamp-beams and clamps for securing the conductors at the hand-holes, substantially as described.

In testimony whereof I have signed my name to this specification in the presence of two subscribing witnesses.

THOMAS WALLACE.

Witnesses:
B. F. GETCHELL,
STERLING WALLACE.